United States Patent Office 3,563,871
Patented Feb. 16, 1971

3,563,871
PROCESS FOR REDUCING THE SURFACE FRICTION OF AN ELASTOMER USING RADIATION AND AN OXYGEN FREE ATMOSPHERE
Seymour Newman, Southfield, Robert A. Pett, Westland, and Robert W. Sanderson, Birmingham, Mich., assignors to Ford Motor Company, Dearborn, Mich., a corporation of Delaware
No Drawing. Filed Nov. 14, 1969, Ser. No. 877,044
Int. Cl. C08d 1/00; C08f 1/18
U.S. Cl. 204—159.14                                     5 Claims

ABSTRACT OF THE DISCLOSURE

Polychloroprene rubber is formed into a desired shape and then treated with radiation having a wavelength between 2000 and 3500 angstroms. The resulting article has an extremely low coefficient of friction at the treated surface but retains its normal flexibility and hardness properties. Including small amounts of surfactant in compounding the rubber produces a still lower friction coefficient after radiation.

SUMMARY OF THE INVENTION

Sealing strips for movable enclosures of vehicles, refrigerators, and other articles must be relatively soft and resilient but at the same time have a relatively low coefficient of sliding friction in order to perform properly. Previous attempts to obtain these properties in a unitary elastomer resulted in a serious conflict because sliding friction generally is inversely proportional to hardness. Designers thus were forced to compromise the properties, which resulted in an elastomer that was harder, less resilient, and more resistant to sliding than desired. A partial solution to the difficulty was effected recently by coating an elastomer having the desired softness and resiliency with a thin, hard polymeric film intended to lower the sliding friction. Such coated articles are relatively expensive, however, and do not provide a friction coefficient sufficiently low to perform properly in the more critical sealing environments found in modern vehicles and appliances.

This invention provides an inexpensive but highly effective process for reducing the surface friction of elastomeric materials, and it results in a unitary elastomeric article having a greatly improved combination of hardness, resiliency and sliding friction. The process comprises forming an elastomeric material having the desired resiliency and hardness into its final shape and then exposing the surfaces on which low friction is desired to radiation having a wavelength between 2000 and 3500 angstroms and sufficient intensity to penetrate the surface portion of the elastomeric material but insufficient to reach the interior portions. Such radiation reduces the coefficient of sliding friction to less than 50 percent of the unexposed elastomeric material without any detectable change in its hardness as measured in International Rubber Hardness Degrees using microindentation techniques.

Useful elastomers include neoprene rubber made from mixtures of polychloroprene with carbon blacks and other additives, nitrile rubbers made from butadiene-acrylonitrile compounds, etc. Including carbon blacks in the compounds permits the use of wider ranges of radiation energies, intensities and exposure times. Total radiation energy densities ranging from 9–75 joules per square centimeter produce useful friction properties for most elastomer compositions. Maximum friction reductions generally require a minimum of about 25 joules per square centimeter.

Including small amounts of surfactants in the composition of the elastomeric material prior to irradiation generally results in an even greater reduction in surface friction. Useful surfactants include fluorochemical surfactants such as the perfluoroalkyl sulfonates obtainable from the 3M Company as FC–98, FC–176, or FX–188. During compounding and forming some of the surfactant is exposed at the surface of the material and the subsequent radiation chemically bonds the exposed surfactant to the surface portion of the elastomer. The surfactant remains in place despite continued rubbing to produce a lower coefficient of sliding friction throughout the life of the article. Instead of compounding the surfactant into the elastomer, the surfactant can be coated on the formed article prior to irradiation.

Careful control of the radiation energy intensity and exposure time is necessary to produce friction reductions without changing the bulk hardness or the resiliency of the material. Best results are obtained with radiation having a wavelength between about 2500 and 3000 angstrom units. It is believed that the sliding friction reduction results from a crosslinked and hardened surface layer of the elastomeric material brought on by the radiation. Because the hardened surface layer is extremely thin, no practical change in bulk hardness or resiliency occurs. For example, hardness measurements conducted according to ASTM D 1415–62T using an indenter having a diameter of $\frac{1}{64}$ inch show no detectable difference in IRHD number as a result of the radiation. Conducting the radiation step in a normal atmosphere produces a significant friction reduction but the friction reduction is sensitive to the age of the article after radiation. Immediately after exposure in air, articles exhibit no reduction in surface friction. After aging for about 1 week, the surface friction declines to less than 50 percent of the untreated value. But four weeks after treatment, the surface friction is back up to 70 percent of the untreated value. Articles radiated in a predominately oxygen free atmosphere that can be made up primarily of nitrogen or argon exhibit immediately friction reductions that deteriorate only slightly with age.

DETAILED DESCRIPTION

Example 1

An extruded polychloroprene closed cell sponge elastomer weatherstrip for a vehicle window seal was exposed to ultraviolet radiation having a principal wavelength of 2537 angstroms in an atmosphere consisting essentially of nitrogen with only traces of oxygen. The intensity of the radiation was about 0.03 watt per square centimeter. Radiation was produced by a low pressure mercury vapor lamp having a quartz window which was located about 1 inch from the weatherstrip during exposure.

Friction coefficients of the resulting material were measured by two techniques. In the first technique a spherical pyrex glass rider having a diameter of 0.260 inch was mounted above a turntable carrying a sample of the exposed material about 2 inches long and $\frac{1}{2}$ inch wide. The sample was rotated at a speed of about 0.002 centimeter per second and the glass rider was loaded onto the sample with a load of 30 grams. In the second technique, a disc of the rubber having a diameter of approximately $\frac{3}{8}$ inch was mounted above a turntable carrying a sheet of glass. The glass was rotated at a speed of approximately 0.02 centimeter per second and the disc was loaded onto the glass with a load of 30 grams.

Comparative tests with untreated material showed reduction in sliding friction from 1.03 to 0.49 after 5 minutes of radiation (9.3 joules per square centimeter), to 0.25 after 10 minutes (18.7 joules per square centimeter), and to 0.22 after 15 minutes (28 joules per square centimeter) using the first technique. After 4 weeks of aging, the friction coefficient of the sample treated for 15 minutes had risen to 0.35. Using the second technique, the friction coefficient dropped from 1.08 to 0.8 after 5 minutes of radiation and to 0.55 after 15 minutes. Samples were aged after radiation and prior to 7 days at room temperature. The treated material is considered to be highly useful as a weatherstrip for a movable vehicle window.

Example 2

The treatment and testing of Example 1 was repeated except that treatment was carried out in air. Testing by the first technique revealed on significant decrease in the friction coefficient immediately after exposure. Approximately 1 week after exposure, however, the friction coefficient had declined to about 0.35. The friction coefficient increased to approximately 0.7 four weeks after exposure.

Example 3

The procedure of Example 1 was repeated except that the material was coated with a perfluoroalkyl sulfonate surfactant (3M Company FC-98) prior to radiation. Although the coefficient of friction of the untreated material was slightly below that of a material without the surfactant (about 1.0), the coefficient increased shortly under continued testing to the value of the surfactant free material. After 15 minutes of ultraviolet radiation the friction coefficient was approximately 0.28. The friction coefficient rose to only 0.30 after several weeks of aging. After several weeks of testing according to the first technique, the friction coefficient remains below approximately 30 percent of its untreated value.

Example 4

A gum nitrile rubber compound free of carbon blacks and having an IRHD hardness of 48 (obtained from the B. F. Goodrich Co. as Hycar 1042) was exposed to radiation having a wavelength of 2537 angstroms for 15 minutes. Testing according to the first technique showed a reduction in the coefficient of friction from approximately 2.1 for the untreated material to approximately 1.0 for the treated material.

Example 5

One weight part of a perfluoroalkyl sulfonate surfactant (obtained from the 3M Company, their designation FC-98) was mixed into each 100 parts of the gum nitrile rubber of Example 4. Friction measurements prior to ultraviolet treatment showed no change in the coefficient of friction. After treatment, however, the coefficient of friction decreased to 0.4.

Example 6

One hundred weight parts of a nitrile rubber compound containing 120 weight parts of carbon black and having an IRHD hardness of 76 was mixed with one weight part of perfluoroalkyl sulfonate surfactant (obtained from the 3M Company, their designation FC-176), and exposed to radiation in accordance with the procedure of Example 4. The surface friction after exposure was 0.2 when measured according to the first technique.

Thus this invention provides a process for significantly reducing the surface friction of elastomeric weatherstrips and other articles for vehicle closures. The process is highly economical and produces material that retains its low coefficient of friction for extremely long periods of time despite extensive use.

What is claimed is:

1. A process for reducing the surface friction of a sealing member made of an elastomeric material consisting essentially of polychloroprene or nitrile rubber comprising forming the elastomeric material into the desired final shape of the sealing member and exposing a surface on which low surface friction is desired to radiation having a wave length between 2000 and 3500 angstroms and having sufficient intensity to penetrate the surface portion of the elastomeric material without changing the overall hardness of the material as measured in International Rubber Hardness Degrees using microindentation techniques, said exposure being carried out in a substantially oxygen free atmosphere.

2. The process of claim 1 comprising including small amounts of fluorochemical surfactant on the surface of the elastomeric material on which low surface friction is desired prior to the radiation treatment, and exposing said surface to said radiation to chemically bond said surfactant to the elastomer during the radiation treatment.

3. The process of claim 2 in which the radiation consists essentially of wavelengths between 2500 and 3000 angstrom units.

4. The process of claim 1 in which the radiation consists essentially of wavelengths between 2500 and 3000 angstroms.

5. The process of claim 1 comprising exposing the surfaces on which low friction is desired to radiation having a total energy density of about 9–75 joules per square centimeter.

References Cited

UNITED STATES PATENTS

| 3,389,098 | 6/1968 | Gladstone et al. | 204—160.1 |
| 3,084,115 | 4/1963 | Smith et al. | 204—160.1 |
| 2,933,441 | 4/1960 | Mallon | 204—160.1 |

FOREIGN PATENTS

| 404,120 | 1/1934 | Great Britain | 204—160.1 |

MURRAY TILLMAN, Primary Examiner

R. B. TURER, Assistant Examiner

U.S. Cl. X.R.

117—93.31; 204—159.18, 159.2; 260—2.5, 41.5, 83.3, 92.3